United States Patent [19]

Sutcliffe et al.

[11] 4,284,593

[45] Aug. 18, 1981

[54] PREPARATION OF SHAPED BODIES

[75] Inventors: Peter W. Sutcliffe, Radley; Jim W. Isaacs, Harwell; Colin E. Lyon, Charlton Heights, all of England

[73] Assignee: United Kingdom Atomic Energy Authority, London, England

[21] Appl. No.: 39,965

[22] Filed: May 17, 1979

[30] Foreign Application Priority Data

May 26, 1978 [GB] United Kingdom ............... 23670/78

[51] Int. Cl.$^3$ .............................................. G21C 21/00
[52] U.S. Cl. ................................ 264/0.5; 252/301.15; 264/56
[58] Field of Search ..................... 252/301.15; 264/0.5, 264/56

[56] References Cited

U.S. PATENT DOCUMENTS

| | | | |
|---|---|---|---|
| 3,912,798 | 10/1975 | Rachor et al. | 264/0.5 |
| 3,995,000 | 11/1976 | Butler et al. | 264/0.5 |
| 4,052,330 | 10/1977 | Jensen et al. | 264/0.5 |
| 4,061,700 | 12/1977 | Gallivan | 264/0.5 |

FOREIGN PATENT DOCUMENTS 38-14800  8/1963  Japan ........................................ 264/0.5

Primary Examiner—Leland A. Sebastian
Attorney, Agent, or Firm—Larson, Taylor and Hinds

[57] ABSTRACT

There is disclosed a method for the preparation of a shaped body which includes pressing a powder to give a "green" shaped body wherein the powder has been made by comminuting a material prepared by means of a gelation process, the material prior to comminuting being of a selected physical configuration.

The invention finds application in relation to the handling and transportation of nuclear fuels and nuclear fuel materials. Thus, a material prepared by means of gelation process can be transported and handled in an environmentally desirable, substantially dust-free form (e.g. spherical particles) and then comminuted to produce a powder for pressing into a shaped nuclear fuel body.

15 Claims, No Drawings

PREPARATION OF SHAPED BODIES

The present invention relates to the preparation of shaped bodies.

In the preparation of shaped bodies by ceramic techniques it can be important to seek to avoid or minimise the presence of dust during processing, partly to reduce losses from the processing cycle but often more importantly to reduce the hazard to health.

Thus, for example, dust hazards can arise where the material to be formed into a shaped body (e.g. by pressing and sintering) has to be handled in a finely subdivided powder form during the preparation of a shaped body.

The health hazard from dust is even more of an acute problem where the dust is a toxic and/or a radioactive material.

It is one object of the present invention to provide a method for the preparation of a shaped body in which the number of process stages at which there is likely to be a dust hazard may be reduced.

According to one aspect of the present invention there is provided a method for the preparation of a shaped body which includes pressing a powder to give a "green" shaped body wherein the powder has been made by comminuting a material prepared by means of a gelation process, the material prior to comminuting being of a selected physical configuration.

According to another aspect of the present invention there is provided a method for the preparation of a shaped body which includes comminuting a material prepared by means of a gelation process to give a powder and pressing the powder to give a "green" shaped body, the material prior to comminuting being of a selected physical configuration.

The "green" shaped body can be subsequently sintered to give a sintered shaped body.

By "of a selected physical configuration" we mean that the material prior to comminuting is a shaped body or comprises a plurality of shaped bodies.

A preferred selected physical configuration is that of a substantially spherical particle and the material for comminuting preferably comprises a plurality of substantially spherical particles.

We prefer that the pressing is by means of cold pressing. By "cold pressing" we mean a process in which a material is compacted at ambient (i.e. normal room) temperature. For example, particulate material can be subjected to a uniaxially applied pressure in a die pressing apparatus without heating of the apparatus such that the temperature of the apparatus remains at a value close to normal room temperature. A further example of a cold pressing process is isostatic pressing with a flexible mould at normal room temperature. Cold pressing processes are distinguished from hot pressing processes in that in the latter a temperature elevated above normal room temperature is used.

It will be appreciated that the present invention can provide a method for the preparation of a shaped body which requires handling powder only after comminuting. Thus, prior to comminution the material can be transported and handled in substantially dust-free physical configuration form (e.g. substantially spherical particles).

The comminution to make the powder can be carried out by milling. In one embodiment the milling can be rotary ball milling. In another embodiment the milling can be vibratory ball-milling. By vibratory ball-milling we mean a process in which the material to be comminuted is retained in a mill pot containing a charge of balls and which is subject to a gyratory motion.

In one embodiment we prefer to carry out the comminution in the presence of an organic binder such as paraffin wax since this reduces the amount of "dust" released for example during comminution and/or handling after comminution.

An example of a type of gelation process suitable for use in preparing material for comminution in accordance with the present invention is the so-called gel precipitation process. Other gelation processes such as sol-gel and internal gelation may be used to prepare material for comminution in accordance with the present invention.

It is to be understood that the direct product of the gelation process need not necessarily be the material for comminution and thus, that the product of the gelation process may need further post-gelation treatment to prepare the material for comminution.

Such further post-gelation treatment may involve washing (e.g. with water), ageing (e.g. treatment to modify the crystallinity and structure of the product of gelation), specific drying operations (e.g. by gases optionally containing water vapour or steam or by contacting with organic liquids) and/or heating. In the case of a product of gelation produced by a gel precipitation process the heating may be used to effect at least some debonding. "Debonding" is the process of heating a gel precipitate to remove organic substances (e.g. the gelling agent or a derivative thereof) therefrom.

The post-gelation treatment(s) may be selected and controlled with the purpose of providing a material having properties which are substantially optimised for comminution.

For example, where it is desired to produce a shaped body comprising a coherent body of high density (e.g. a solid fuel pellet) this may be facilitated if the material to be comminuted is friable (e.g. has a readiness to be comminuted by milling in a convenient time (e.g. ~16 hours)).

Thus, in the case of a product of gelation produced by a gel precipitation process, it can be desirable to control the debonding temperature and time, since it has been found that debonding conditions greatly in excess of the minimum required for removal of carbon associated with the gelling agent lead to a material requiring longer milling times to produce a powder suitable for the production of high density shaped bodies.

It has been found that the density of the shaped body may be increased by use of longer milling times.

By way of further example, it is believed that a porous shaped body can be prepared by arranging for carbon to operate as a fugitive additive. The carbon could be derived from a gelling agent, or added as carbon (solid colloidal) prior to formation of the gel precipitate, or both.

British Patent Specifications Nos. 1,175,834, 1,231,385, 1,253,807, 1,313,750 and 1,363,532 relate to gel precipitation processes and reference should be made to these for information regarding such processes. British Patent Specification No. 1,313,750 discloses "modifying agent" which can be used in gel precipitation processes (e.g. in the preparation of particles containing actinide metal species such as uranium and/or plutonium species).

(Some soluble gelling agents may be removed from a gel precipitate by use of a suitable solvent.)

Briefly, in the production of a material for comminution by means of one form of gel precipitation process, a feed solution containing a compound of an element, (typically of a metal) and an organic gelling agent (gelating agent) or agents, is contacted with a precipitating agent to give a gel precipitate containing the element and the gelling agent, or derivative thereof. It will be understood that the element will generally be present in the form of a compound, rather than as the free element. The feed solution may, for example, contain soluble salts as compounds or colloidal dispersions (i.e. sols) of compounds.

The feed solution may also contain other constituents such as a modifying agent as hereinbefore mentioned.

The gel precipitate is conveniently subjected to washing with water and other further post-gelation treatments as hereinbefore disclosed.

The degree of debonding and sintering to which a gel precipitate should be subjected in accordance with the present invention is discussed further hereinafter.

The organic gelling agent enables the feed solution to gel in a coherent manner in the presence of a precipitating agent. Organic gelling agents can be water soluble high molecular weight polymeric compounds as disclosed in the British Patent Specifications hereinbefore mentioned. In some circumstances gelling agents can be low molecular weight compounds (e.g. glucose or glycerol which are monomeric). These low molecular weight compounds can normally only be used in gel precipitation feed solutions of low acidity and the wet strength of the gel precipitate produced using them is generally lower than those formed with polymeric gelling agents.

Gelation processes can be used to produce gels in selected physical configurations by contacting the feed solution or sol to be gelled with a gelling agent in an appropriate physical configuration. For example in the case of gel precipitation, spheres or fibres can be produced by contacting respectively droplets or filaments of the feed solution with a precipitating agent.

Concerning sol-gel processes, these involve the conversion of a colloidal dispersion (a sol) to a gel, for example by either removal of water (i.e. drying) or removal of ions (e.g. anions in the case of alumina or zirconia) which stabilise the dispersion.

The product of gelation produced by a sol-gel process may be subjected to the further post-gelation treatments as hereinbefore disclosed (e.g. ageing, drying and heating) substantially to optimise the properties for comminution.

In a sol-gel process the cohesive structure of the product of gelation derives from the interaction of the colloidal units themselves to form a gel. Thus, the use of an organic gelling agent is not essential. However, organic molecules may be added to the colloidal dispersion with a view to modifying the structure of the gel (e.g. to introduce porosity).

Concerning internal gelation, this involves a precipitation from a salt solution in which the reagent for causing the precipitation is generated in situ within a feed solution from a precursor for the reagent (e.g. a hexa-methylene tetramine can be incorporated in a feed solution and heated to liberate ammonia as the precipitating agent).

The product of gelation of an internal gelation process may be subjected to the further post-gelation treatments as hereinbefore disclosed (e.g. ageing, drying and heating) substantially to optimise the properties for comminution. These properties may also be controlled by varying the composition of the feed solution. The internal gelation process generally involves the use of a metal salt and a complexing agent for the metal thereof. The properties of the gel can be controlled by controlling the ratio, metal salt:complexing agent:precipitating reagent precursor.

We prefer that the material has been produced by means of a gel precipitation process.

The gel precipitate can be partially, or fully, debonded, and optionally at least partially subsequently sintered to prepare the material for comminution. However, as hereinbefore mentioned the debonding conditions may be restricted to provide a material which is friable so as to facilitate comminution.

Thus in accordance with a preferred embodiment of the present invention, there is provided a method for the preparation of a sintered shaped body which includes comminuting at least partially debonded gel precipitate to give a powder, pressing the powder to give a "green" shaped body and heating the "green" shaped body to effect sintering thereof.

Selection of the degree of debonding and optionally the degree of subsequent sintering of the gel precipitate, the properties thereof for comminution and pressing can be optimised. Thus, by the choice of degree of debonding (and optionally degree of sintering) the properties can be influenced such that the gel precipitate is sufficiently mechanically robust and dense to facilitate handling and the production of dense (i.e. $\leq 80\%$ T.D.) shaped bodies but is still sufficiently "friable" to an extent which facilitates comminution and subsequent pressing to give the shaped body.

It will be appreciated that comminution of the at least partially debonded gel precipitate avoids the necessity of sintering before comminution and for optimum comminution by milling sintering should be substantially avoided. However, at least some sintering may optionally be carried out to give particular desired properties. For example, at least some sintering may be carried out to produce a robust material if violent transport conditions are envisaged.

Further debonding (if necessary) and sintering can be effected after the shaped body has been formed by pressing powder produced by comminution of the material.

The present invention finds an application in relation to the handling and transportation of nuclear fuels and nuclear fuel materials (e.g. oxide fuels containing plutonium and uranium oxide).

Thus for example a material prepared by means of a gel precipitation process can be transported and handled in an environmentally desirable, substantially dust-free form as a gel precipitate (or material derived therefrom by debonding, or debonding and sintering) and then comminuted to produce a powder and the powder pressed into the desired shape of fuel body required for particular nuclear applications.

For example the material can be particles (e.g. substantially spherical particles) produced by means of a gel precipitation process, these can be milled to give a powder, and the powder pressed into a nuclear fuel pellet (e.g. of substantially right-circular cylindrical shape or annular shape).

The present invention offers the possibility of reducing the number of stages at which there is likely to be a dust hazard in forming shaped nuclear fuel bodies. Also the accuracy of pressing operations with materials prepared by means of a gelation process may reduce the need for shaping of the bodies after pressing, for example by grinding and thus obviates further steps likely to produce dust (i.e. may be such that after sintering the body is of the desired shape and size.

In addition to the influence of the further, post-gelation, treatments as hereinbefore disclosed (e.g. washing and drying) in the case of a gel precipitate the choice of organic gelling agent can influence the comminution properties.

The choice of gelling agent should preferably be such that it can be removed during debonding and any residual carbon therefrom be capable of subsequent removal. Also, the organic gelling agent should not give rise to structural nor sintering problems during sintering of the shaped body. If it is desired to reduce the risk of sintering during debonding, the organic gelling agent may, for example, be chosen to debond at a low temperature (e.g. $<700°$ C.).

Where the powder made by comminuting of a material prepared by means of a gelation process (and optionally treated by post-gelation treatments as hereinbefore disclosed) is a non-free flowing powder a binder (e.g. paraffin wax) may be added and the powder and binder agglomerated to provide agglomerated powder and binder suitable for automatic and homogeneous die filling. The binder may also act as a lubricant during the pressing operation as well as providing strength and satisfactory handling properties in the "green" shaped body.

According to another aspect the invention provides a shaped body whenever prepared by a method in accordance with the invention.

Examples of shaped bodies prepared in accordance with the present invention are right-circular cylindrical pellets (diameter 5 mm) of (70% U/30% Pu) $O_2$. These were produced from substantially spherical particles (U/Pu) $O_2$ prepared by debonding a gel precipitate of corresponding chemical composition. The gel particles were prepared by contacting appropriate feed solutions with ammonia gas/ammonium hydroxide as the precipitating agent. The appropriate feed solution contained uranyl and plutonium nitrates, nitric acid, formamide (as a modifying agent) and polyacrylamide (as an organic gelling agent).

The invention will now be further described, by way of example only, as follows:

EXAMPLE 1

Gel spheres containing ammonium diuranate and hydrated plutonium oxide were prepared by a gel precipitation process in accordance with claim 1 of British Patent Specification No. 1363532 (UKAEA).

The feed solution contained uranyl nitrate, plutonium nitrate, nitric acid, formamide, polyacrylamide and water in proportions such that after debonding and sintering the resulting product would be substantially (70% U/30% Pu)$O_2$.

The feed solution was formed into droplets and gelled with ammonia/ammonium hydroxide using a foam layer. Reference may be made to British Patent Specification No. 1401962 (UKAEA) regarding the use of a foam layer in forming gel particles.

The resulting gel spheres ($\sim$3 mm diameter) were aged in ammonium hydroxide, subsequently washed in water, and dried by contact with hexanol.

The gel spheres were debonded by heating in flowing $CO_2$ at 800° C. The resulting debonded spheres (mercury immersion density of 8.0 g.cm$^{-3}$) were loaded into an Apex vibratory ball mill pot (450 ml capacity) having a lining of tungsten carbide with a charge of 24 tungsten carbide balls (19 mm diameter).

The pot was gyrated at 1500 cycles.min$^{-1}$ at an amplitude of 5 mm for 8 hours to give a milled powder.

The powder was cold pressed to give green pellets using a tungsten carbide lined die and plunger apparatus (5.9 mm diameter) at 31 tons.sq in$^{-1}$.

The die walls were lubricated with stearic acid. The geometric density of the green pellets was 7.1 g.cm$^{-3}$.

The green pellets were sintered in a flow of 5% hydrogen in argon at 1600° C. to give a density of 10.78 g.cm$^{-3}$ (Hg immersion density). This is 97.7% of theoretical density for (70% U/30% Pu) $O_2$. The diameter shrinkage on sintering was 13.4%.

The sintered pellets were free of cracks and chips, substantially free of barreling, and of suitable integrity to be robust enough for satisfactory handling during subsequent fuel pin filling operations. The shape of the pellets was such that no grinding was necessary on their external cylindical surface to meet fuel pin filling requirements.

EXAMPLE 2

Gel spheres were produced by the procedure disclosed in Example 1. The proportions of the feed solution were such that after debonding and sintering the resulting product would be substantially (70% U/30% Pu) $O_2$. The gel spheres were washed, dried, and debonded as in Example 1.

Subsequently the debonded spheres were sintered by heating in 5% hydrogen in argon at 1600° C. and the sintered spheres milled in an Apex vibratory ball mill (see Example 1) for 4 hours. 1.5 wt/% paraffin wax (binder) was added to the mill pot and the milling continued for a further 5 hours.

The milled powder (plus binder) was pressed to 1.6 mm thickness discs which were subsequently broken up to give a free flowing powder by rubbing through a 10 mesh (1700 $\mu$m) sieve. "Fines" were removed from the powder by use of a 100 mesh (150 $\mu$m) sieve.

The resulting powder was pressed in a 8.96 mm diameter die at 31 tons.sq in$^{-1}$ to give green pellets of geometric density 8.34 g.cm$^{-3}$.

The green pellets were sintered in a flow of 5% hydrogen in argon at 1600° C. to give sintered pellets of 10.67 g.cm$^{-3}$ mean density (96.7% theoretical density).

EXAMPLE 3

Gel spheres were produced by the procedure disclosed in Example 1. The proportions of the feed solution were such that after debonding and sintering the resulting product would be substantially (70% U/30% Pu) $O_2$. The gel spheres were washed and dried as in Example 1 and debonded by heating in flowing $CO_2$ at 790° C. for 4 hours.

The resulting debonded spheres (mercury immersion density of 7.0 g.cm$^{-3}$ and surface area of 4.5 m$^2$g$^{-1}$) were loaded into a stainless steel mill pot (750 ml capacity) having a charge of stainless steel balls consisting of 31 balls of 18 mm diameter and 26 balls of 12 mm diameter.

The mill pot was rotated at 120 revolutions per minute for 16 hours to give a milled powder (surface area 5.6 m$^2$g$^{-1}$).

The powder was cold pressed to give green pellets using a tungsten carbide lined die and plunger apparatus (5.9 mm diameter) at 25 tons.sq in$^{-1}$. The geometric density of the "green" pellets was 6.59 g.cm$^{-3}$.

The green pellets were sintered in a flow of 5% hydrogen in argon at 1600° C. to give a density of 11.01 g.cm$^{-3}$ (bulk density by the method of immersion in ethylene dibromide). This is 99.8% of theretical density for (70% U/30% Pu) O$_2$. The diameter shrinkage on sintering was 15.4%.

The sintered pellets were free of cracks and chips, substantially free of barreling, and of suitable integrity to be robust enough for satisfactory handling during subsequent fuel pin filling operations. The shape of the pellets was such that no grinding was necessary on their external cylindrical surface to meet fuel pin filling requirements.

EXAMPLE 4

Gel spheres were produced by the procedure disclosed in Example 1. The proportions of the feed solution were such that after debonding and sintering the resulting product would be substantially (70% U/3% Pu) O$_2$.

The gel spheres were washed and dried as in Example 1 and debonded by heating in flowing CO$_2$ at 820° C. for 7 hours.

The resulting debonded spheres (mercury immersion density 10.2 g.cm$^{-3}$) were rotary ball-milled as in Example 3 for 24 hours to give a powder.

The powder was cold pressed to give green pellets in a tungsten carbide lined die and plunger apparatus (5.9 mm diameter) at 31 tons.sq in$^{-1}$. The geometric density of the "green" pellets was 8.03 g.cm$^{-3}$.

The green pellets were sintered as in Example 3 to give pellets having a density of 10.80 g.cm$^{-3}$ (Hg immersion density) (97.9% theoretical).

EXAMPLE 5

The procedure of Example 4 was followed with the exception that the debonded spheres (mercury immersion density 10.2 g.cm$^{-3}$) were rotary ball-milled (as in Example 3) for 16 hours to give a powder.

The powder was cold pressed to give green pellets as in Example 4. The geometric density of the "green" pellets was 8.06 g.cm$^{-3}$.

The green pellets were sintered as in Example 4 to give pellets having a density of 10.15 g.cm$^{-3}$ (Hg immersion density) (92.0% theoretical).

EXAMPLE 6

Debonded spheres were prepared by the procedure disclosed in Example 4 and rotary ball-milled for 24 hours to give a powder.

A binder was added to and mixed with the powder in an amount sufficient to give a granular mix which was not sticky and had no obvious excess of binder. [The binder used was that available under the Trade Name Cranco (ICI Ceramic Medium F190-82) This binder is a methacrylate based substance. The binder was diluted before use with a halogenated hydrocarbon solvent available as SS 21 (manufactured by Nutfield Manufacturing Co., Redhill, Surrey)].

The granular mix was sieved and coarse granules >710 $\mu$m were broken up. The resulting material was then pressed as in Example 4 to give a green pellet of density 8.17 g.cm$^{-3}$.

The green pellet was sintered as in Example 4 to give a sintered pellet of density 10.67 g.cm$^{-3}$ (96.7% theoretical).

We claim:

1. A method for the preparation of a shaped body which includes pressing a powder to give a "green" shaped body wherein the powder has been made by comminuting gel particles prepared by means of a gelation process, said gel particles prior to comminuting being of a size which presents no substantial dust hazard.

2. A method as claimed in claim 1 which includes comminuting gel particles prepared by means of a gelation process to give a powder and pressing the powder to give a "green" shaped body, the gel particles prior to comminuting being of a size which presents no substantial dust hazard.

3. A method as claimed in claim 1 wherein the green shaped body is subsequently sintered to give a sintered shaped body.

4. A method as claimed in claim 1 wherein the material for comminuting comprises a plurality of substantially spherical particles.

5. A method as claimed in claim 1 wherein the pressing is cold pressing.

6. A method as claimed in claim 1 wherein the comminution is carried out by milling.

7. A method as claimed in claim 6 wherein the milling is rotary ball milling or vibratory ball milling.

8. A method as claimed in claim 1 wherein the comminution is carried out in the presence of an organic binder.

9. A method as claimed in claim 1 wherein the material is prepared by means of a gel precipitation process, a sol-gel process or an internal gelation process.

10. A method as claimed in claim 1 wherein the direct product of the gelation process is subjected to post-gelation treatment to prepare the material for comminution.

11. A method as claimed in claim 10 wherein the temperature and time of debonding of a material produced by a gelation process is controlled to produce a material which is friable so as to facilitate comminution and subsequent pressing.

12. A method as claimed in claim 1 for the preparation of a sintered shaped body which includes comminuting at least partially debonded gel precipitate to give a powder, pressing the powder to give a "green" shaped body and heating the "green" shaped body to effect sintering thereof.

13. A method as claimed in claim 1 for the preparation of a shaped nuclear fuel body which comprises milling particles produced by means of a gel precipitation process to give a powder and pressing the powder into the shaped nuclear fuel body.

14. A method as claimed in claim 13 wherein the shaped nuclear fuel body is a nuclear fuel pellet.

15. A method as claimed in claim 13 wherein the nuclear fuel pellet is a pellet of (70% U/30% Pu) O$_2$.

* * * * *